US008423318B1

(12) United States Patent
Baker et al.

(10) Patent No.: US 8,423,318 B1
(45) Date of Patent: Apr. 16, 2013

(54) OBJECT MANAGEMENT SYSTEM

(75) Inventors: Randy D. Baker, St. Charles, MO (US); Joseph D. Doyle, St. Charles, MO (US); Jeremy Glenn Eagan, St. Charles, MO (US); Robin A. Rongey, Edwardsville, IL (US); Anthony Michael Thomason, St. Louis, MO (US); Paul Robert Davies, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 262 days.

(21) Appl. No.: 12/884,261

(22) Filed: Sep. 17, 2010

(51) Int. Cl.
*G01C 9/00* (2006.01)

(52) U.S. Cl.
USPC ............ 702/150; 345/420; 702/152; 702/153

(58) Field of Classification Search ............... 702/93, 702/94, 95, 104, 144, 150, 152, 153, 155, 702/158, 186; 345/419, 420; 700/98, 182
See application file for complete search history.

(56) References Cited

U.S. PATENT DOCUMENTS

| | | | |
|---|---|---|---|
| 5,610,824 | A | 3/1997 | Vinson et al. |
| 6,606,528 | B1 | 8/2003 | Hagmeier et al. |
| 7,023,432 | B2 | 4/2006 | Fletcher et al. |
| 7,778,794 | B2 | 8/2010 | Davies et al. |
| 7,814,441 | B2 | 10/2010 | Bae et al. |
| 7,831,543 | B2 | 11/2010 | Milstead et al. |
| 7,920,943 | B2 | 4/2011 | Campbell et al. |
| 2003/0067461 | A1 | 4/2003 | Fletcher et al. |
| 2004/0243481 | A1 | 12/2004 | Bradbury et al. |
| 2007/0100858 | A1 | 5/2007 | Milstead et al. |
| 2008/0079729 | A1 | 4/2008 | Brailovsky |
| 2010/0205121 | A1 | 8/2010 | Quadracci et al. |
| 2010/0205192 | A1 | 8/2010 | Quadracci et al. |
| 2010/0205212 | A1 | 8/2010 | Quadracci et al. |
| 2011/0300880 | A1 | 12/2011 | Muller et al. |
| 2012/0071998 | A1 | 3/2012 | Davies et al. |

OTHER PUBLICATIONS

U.S. Appl. No. 12/884,282, filed Sep. 17, 2010, Davies et al.
Ashford, "Component Programming System", U.S. Appl. No. 13/300,785, filed Nov. 21, 2011, 75 pages.
Office Action, dated Jan. 20, 2012, regarding U.S. Appl. No. 12/884,282, 19 pages.
Final Office Action, dated May 23, 2012, regarding U.S. Appl. No. 12/884,282, 14 pages.
Notice of Allowance, dated Dec. 11, 2012, regarding U.S. Appl. No. 12/884,282, 7 pages.
Office Action, dated Feb. 15, 2013, regarding U.S. Appl. No. 13/300,785, 21 pages.

*Primary Examiner* — John H Le
(74) *Attorney, Agent, or Firm* — Yee & Associates, P.C.

(57) ABSTRACT

A method and apparatus for managing information about an object. A location on the object is identified. An association between the location on the object and a number of points in a point cloud for the object is identified. The number of points in the point cloud is associated with a number of parts for the object. The location on the object is associated with the number of parts for the object based on the association of the location on the object with the number of points in the point cloud. An identification of the number of parts associated with the location on the object is presented on a graphical user interface on a display system. Information for the location on the object in a number of types of media is identified. The information for the location on the object is associated with the location on the object.

32 Claims, 10 Drawing Sheets

OBJECT MANAGEMENT SYSTEM

CROSS-REFERENCE TO RELATED APPLICATION

This application is related to the following patent application: entitled "Point cloud Generation System", Ser. No. 12/884,282, filed on Sep. 17, 2010; filed even date hereof, assigned to the same assignee, and incorporated herein by reference.

BACKGROUND INFORMATION

1. Field

The present disclosure relates generally to managing objects and, in particular, to a method and apparatus for managing parts for objects. Still more particularly, the present disclosure relates to managing information for parts for objects.

2. Background

Typically, manufacturing structures for objects involves assembling numerous parts together to form the structures. For example, during the manufacturing of an aircraft, parts are assembled to form different structures for the aircraft. For example, a wing of an aircraft may have skin panels, spars, ribs, fasteners, and/or other suitable types of parts. With the large number of parts used to assemble an aircraft, operators may perform numerous operations to assemble the parts together to form structures for the aircraft.

For example, parts for a structure in an aircraft may be assembled using fasteners. The parts may be, for example, parts to be fastened to each other or to be fastened to other parts in a partially-formed structure using the fasteners. During the assembly of these parts, the operator may look at the parts to identify the parts to be assembled. The operator may then leave the parts to go to a station with a computer to identify the fasteners that are needed to assemble the parts to form the structure. Based on the visual identification of the parts made by the operator, the operator may search a database or other source using a computer to identify the fasteners that are designed for use in assembling parts.

This type of process takes time. Further, an operator may misidentify a part with this type of process. If an operator misidentifies a part, the operator may select fasteners for use that do not fit the actual part and/or that may need to be replaced at a later point in time.

In another example, a structure may be partially assembled when one operator begins work on that structure. With this situation, the operator identifies the structure, even though the structure may not be completed. For example, the structure may be a wing, a stabilizer, an overhead bin assembly, or some other suitable type of structure. The operator then looks for instructions or searches a database for parts and/or fasteners needed to complete the assembly of the structure. This process takes time.

Further, when inspections are performed on different structures of an aircraft, inconsistencies may be identified by the operators performing the inspections. The operators enter any noticed inconsistencies in a database for further processing. This type of inspection takes time and also requires the operator to correctly identify the parts having inconsistencies. This type of identification may be made more difficult and time-consuming when a structure is only partially assembled.

Therefore, it would be advantageous to have a method and apparatus that takes into account at least some of the issues discussed above, as well as other possible issues.

SUMMARY

In one advantageous embodiment, a method is provided for managing information about an object. A location on the object is identified. An association between the location on the object and a number of points in a point cloud for the object is identified. The number of points in the point cloud is associated with a number of parts for the object. The location on the object is associated with the number of parts for the object based on the association of the location on the object with the number of points in the point cloud. An identification of the number of parts associated with the location on the object is presented on a graphical user interface on a display system. Information for the location on the object in a number of types of media is identified. The information for the location on the object is associated with the location on the object.

In another advantageous embodiment, an apparatus comprises a sensor system and a computer system in communication with the sensor system. The sensor system is configured to generate information for a location on an object in a number of types of media. The computer system is configured to identify the location on the object using the information generated by the sensor system. The computer system is configured to identify an association between the location on the object and a number of points in a point cloud for the object. The number of points in the point cloud is associated with a number of parts for the object. The computer system is configured to associate the location on the object with the number of parts for the object based on the association of the location on the object with the number of points in the point cloud. The computer system is configured to present an identification of the number of parts associated with the location on the object on a graphical user interface on a display system. The computer system is configured to associate the information for the location on the object generated by the sensor system in the number of types of media with the location on the object.

In yet another advantageous embodiment, a portable inspection system comprises a housing, a storage system associated with the housing, a sensor system associated with the housing, a computer system associated with the housing, and a display system associated with the housing. The storage system is configured to store data for parts for an object. The sensor system is configured to generate information for a location on the object in a number of types of media. The information generated by the sensor system comprises at least one of images, video data, and audio data. The computer system is in communication with the storage system and the sensor system. The computer system is configured to identify the location on the object. The computer system is configured to identify an association between the location on the object and a number of points in a point cloud for the object. The number of points in the point cloud is associated with a number of parts for the object. The computer system is configured to associate the location on the object with the number of parts for the object based on the association of the location on the object with the number of points in the point cloud. The computer system is configured to present an identification of the number of parts associated with the location on the object on a graphical user interface on a display system. The computer system is configured to obtain the information for the location on the object from the sensor system. The computer system is configured to associate the information for the location on the object with the location on the object. The computer system is configured to identify a number of inconsistencies in the object using the location on the object, the identification of the number of parts associated with the location on the object, and the information for the location on the object. The display system is in communication with the computer system and is configured to display the identification of the number of parts associated with the location on the object on the graphical user interface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
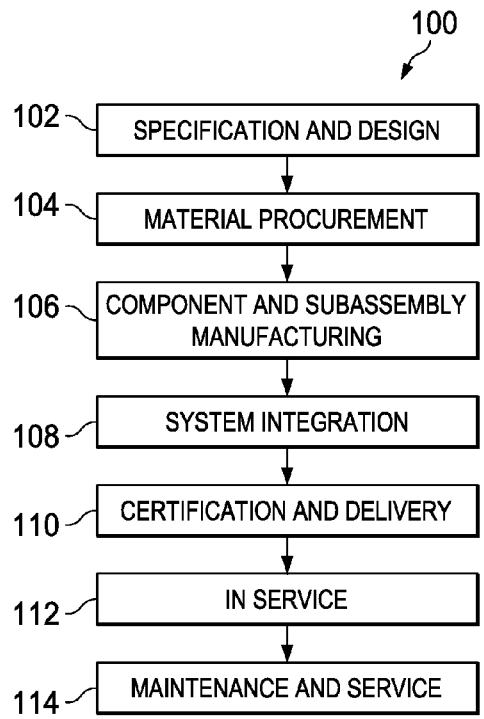
FIG. 1 is an illustration of an aircraft manufacturing and service method in accordance with an advantageous embodiment.
Figure 2:
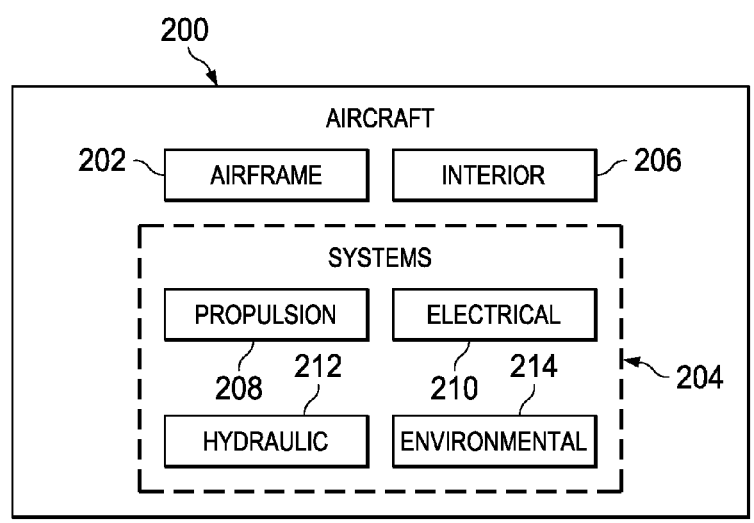
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that the current processes for identifying parts in structures may not be as efficient as desired. The different advantageous embodiments recognize and take into account that an operator may search a database of parts for a structure to identify parts.

Further, the different advantageous embodiments recognize and take into account that the operator may attempt to visually recognize parts in a structure to perform a particular operation. This operation may include, for example, further assembly of the structure, inspection of the structure, maintenance of the structure, and/or other suitable operations.

The different advantageous embodiments recognize and take into account that the currently used processes may take more time than desired to identify parts. Further, in some cases, the currently used processes may result in improper identifications of parts for which operations should be performed. These improper identifications may require reworking the structure, additional inspections, re-identification of the parts, and/or other operations. These additional operations may increase the time and expense for assembling structures.

Further, the different advantageous embodiments recognize and take into account that in having operators identify parts and enter information about those parts, data entry errors may occur. As a result, the integrity of data for structures being assembled may not be as great as desired.

Thus, the different advantageous embodiments provide a method and apparatus for managing information about an object. In one advantageous embodiment, a location on an object is identified. An association between the location on the object and a number of points in a point cloud for the object is identified. The number of points in the point cloud is associated with a number of parts for the object. The location on the object is associated with the number of parts for the object based on the association of the location on the object with the number of points in the point cloud. An identification of the number of parts associated with the location on the object is presented on a graphical user interface on a display system. Information for the location on the object in a number of types of media is identified. The information for the location on the object is identified with the location on the object.

In another advantageous embodiment, a method for generating data for a point cloud is provided. Vertices for a model of an object are identified. The object comprises a plurality of parts. Identifiers for the plurality of parts are associated with points in the point cloud using the vertices for the object.

Figure 3:
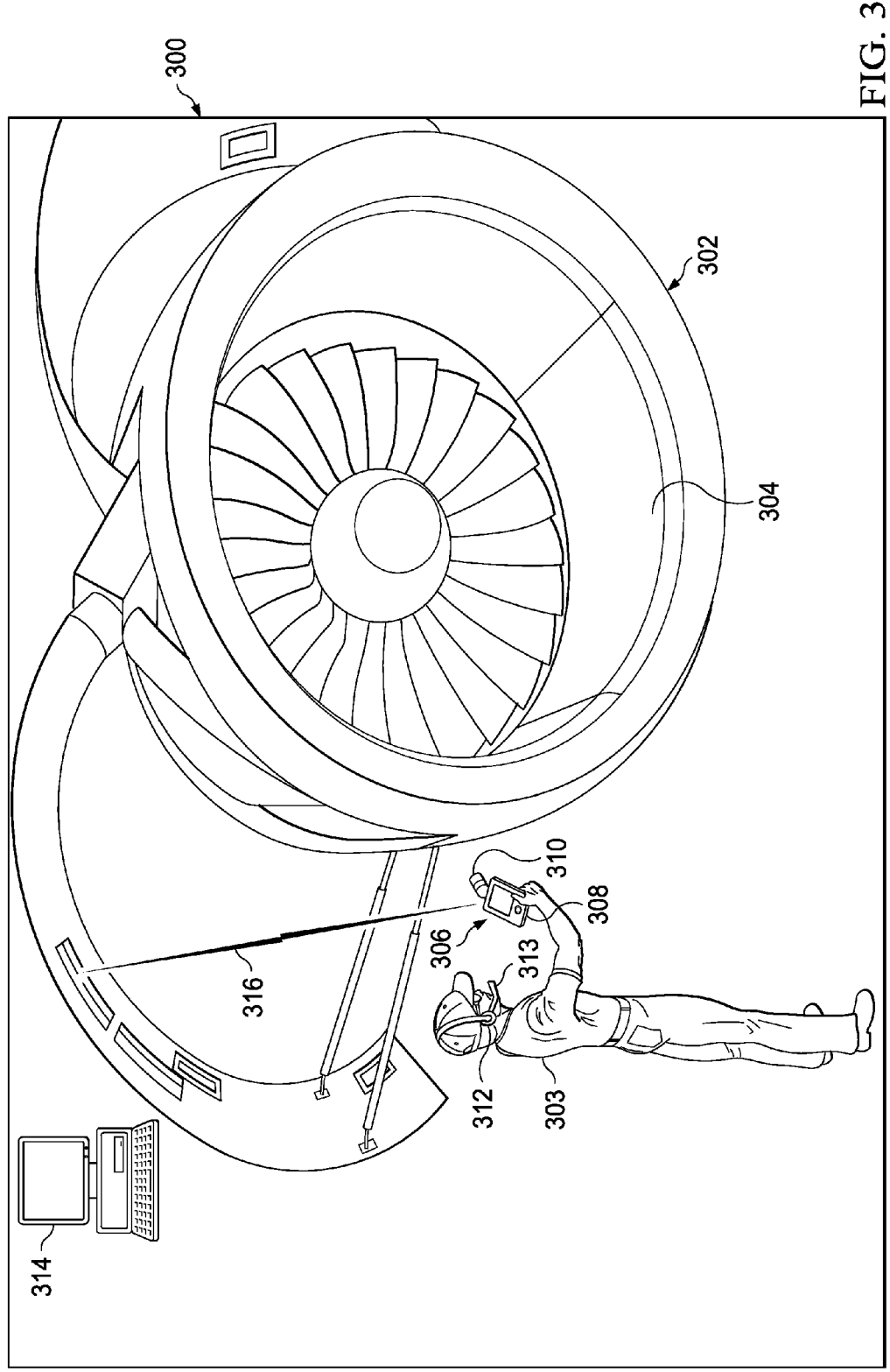
FIG. 3 is an illustration of an object management environment in accordance with an advantageous embodiment.

With reference now to FIG. 3, an illustration of an object management environment is depicted in accordance with an advantageous embodiment. In this illustrative example, object management environment 300 is an example of an environment in which object 302 is managed. Object 302, in this example, is a structure in an aircraft, such as aircraft 200 in FIG. 2. As depicted, object 302 is engine 304 for an aircraft.

In this illustrative example, operator 303 may perform a number of operations for engine 304 in object management environment 300. For example, operator 303 may perform assembly of parts to form engine 304, add parts to engine 304, replace parts in engine 304, perform maintenance for parts in engine 304, rework parts in engine 304, inspect engine 304, test parts in engine 304, and/or perform other suitable types of operations.

These operations may be performed during, for example, aircraft manufacturing and service method 100 in FIG. 1. For example, these operations may be performed during material procurement 104, component and subassembly manufacturing 106, system integration 108, certification and delivery 110, in service 112, maintenance and service 114, and/or some other suitable phase of aircraft manufacturing and service method 100 in FIG. 1.

As depicted, operator 303 collects information about engine 304 to perform these types of operations. This information may be information about the parts in engine 304. For example, operator 303 collects information for use in identifying parts in engine 304 to perform different operations. Further, the information may be in the form of images, video, and/or audio recordings about engine 304. This information is used, for example, without limitation, to identify inconsistencies in engine 304, generate reports for engine 304, identify a state for engine 304, and/or perform other types of operations.

Inconsistencies may include, for example, without limitation, a part in engine 304 not meeting selected performance requirements, a diameter of a hole in the part not being within selected tolerances, a thickness for a part not being within selected tolerances, and/or other types of inconsistencies.

In this illustrative example, operator 303 uses information collection system 306 to collect the information about engine 304. Information collection system 306 is a portable system in this example. Information collection system 306 includes handheld computer 308, camera 310, and headset 312.

Camera 310 is a video camera, in this example. Camera 310 is configured to generate video for different locations of interest on engine 304 as operator 303 moves around engine 304 with information collection system 306. Headset 312 includes microphone 313. Operator 303 may use a microphone to create audio recordings for the different locations of interest. As one illustrative example, operator 303 may record audio descriptions of the appearance of a part in engine 304, the state of engine 304, and/or other suitable information.

Handheld computer 308 is configured to process the information generated by camera 310 and microphone 313 in headset 312. In particular, handheld computer 308 is configured to identify locations on engine 304 using the information and identify parts for engine 304 associated with the locations on engine 304. Further, handheld computer 308 is configured to associate the information collected for engine 304 with the different locations of interest.

In this illustrative example, handheld computer 308 is configured to send this information to computer system 314 using wireless communications link 316. In other words, handheld computer 308 is in communication with computer system 314. Handheld computer 308 may be in communication with computer system 314 through a wireless communications link and/or wired communications link.

As depicted, computer system 314 is located remotely to information collection system 306. For example, computer system 314 may be located at a computer station in an office located remotely to the work area for which operations are performed for engine 304.

As one illustrative example, computer system 314 may be configured to use the information received from handheld computer 308 to make decisions about the parts in engine 304. These decisions may be used by operator 303 to perform operations on engine 304.

Figure 4:
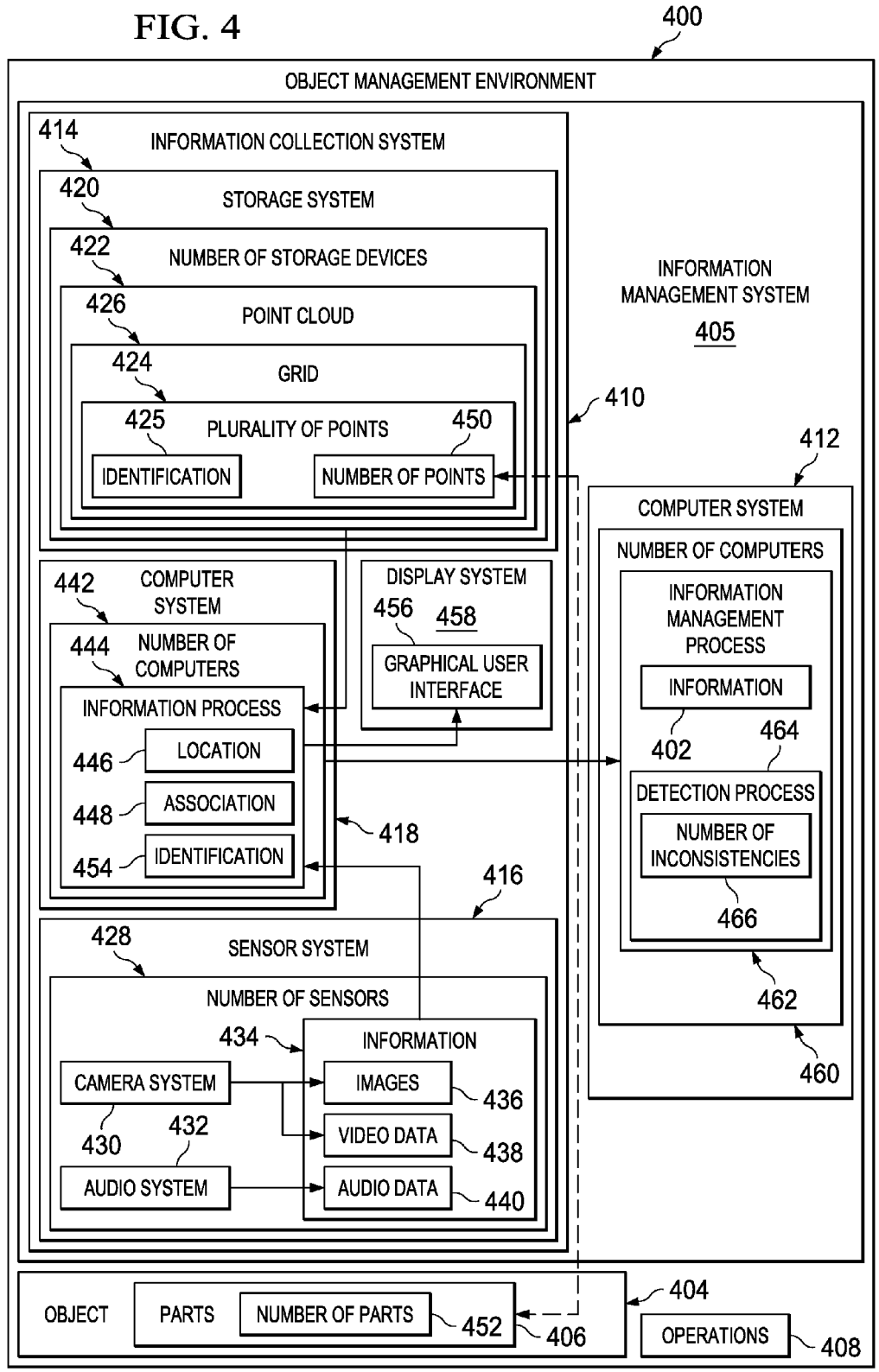
FIG. 4 is an illustration of an object management environment in accordance with an advantageous embodiment.

With reference now to FIG. 4, an illustration of an object management environment is depicted in accordance with an advantageous embodiment. In this illustrative example, object management environment 300 in FIG. 3 is an example of one implementation for object management environment 400 in FIG. 4. Object management environment 400 is an environment in which object 404 and information 402 for object 404 are managed.

In these illustrative examples, object 404 is a physical object. Object 404 may be, for example, a structure in aircraft 200 in FIG. 2. In other illustrative examples, object 404 may take the form of aircraft 200 in FIG. 2.

As depicted, object 404 includes parts 406 that may be assembled together to form object 404. Operations 408 may be performed for object 404 by an operator in object management environment 400 to manage object 404. Operations 408 may include, for example, without limitation, assembling parts 406, reworking a part in parts 406, adding a part to parts 406 in object 404, replacing a part in parts 406, collecting information about the state of object 404, performing an inspection of object 404, performing maintenance of parts 406 for object 404, and/or other suitable types of operations.

In these illustrative examples, performing an operation in operations 408 may require identifying information 402 about object 404. Information 402 may include, for example, data about object 404, a file, a report, a log, an identification of inconsistencies in object 404, a policy identifying design specifications for object 404, a model for object 404, and/or other suitable types of information.

Information 402 may be managed using information management system 405. Information management system 405 includes information collection system 410 and computer system 412. Computer system 412 is in a location remote to information collection system 410 in these examples. Additionally, information collection system 410 and computer system 412 are in communication with each other in these illustrative examples. For example, information collection system 410 and computer system 412 may exchange information using a wireless and/or wired communications link.

In these depicted examples, an operator may use information collection system 410 to collect information about object 404 when parts 406 for object 404 are not yet assembled, partially assembled, and/or fully assembled together. Information collection system 410 includes storage system 414, sensor system 416, and computer system 418. Storage system 414 and sensor system 416 are in communication with computer system 418.

As illustrated, storage system 414 includes number of storage devices 420. Number of storage devices 420 is configured to store information 402 about object 404. For example, number of storage devices 420 is configured to store point cloud 422 for object 404. Point cloud 422 comprises plurality of points 424 on grid 426. Grid 426 is a three-dimensional grid that is uniformly spaced in these examples. Each of plurality of points 424 in point cloud 422 is associated with data about object 404. This data may include, for example, identification 425 of a part in parts 406 for object 404.

Sensor system 416 includes number of sensors 428. Number of sensors 428 may include at least one of camera system 430, audio system 432, and other suitable types of sensors. Number of sensors 428 is configured to generate information 434. Information 434 comprises, for example, at least one of images 436 generated by camera system 430, video data 438 generated by camera system 430, audio data 440 generated by audio system 432, and other suitable types of information. Number of sensors 428 is configured to send information 434 to computer system 418.

Computer system 418 includes number of computers 442 in this illustrative example. Information process 444 runs on number of computers 442. Information process 444 uses information 434 to identify location 446 on object 404. For example, location 446 may use a number of images in images 436 and/or video data 438 to identify location 446.

Location 446 may be a location identified using a coordinate system. For example, location 446 may be identified using a Cartesian coordinate system. Of course, in other illustrative examples, other coordinate systems, such as a polar coordinate system, may be used.

Information process 444 identifies association 448 between location 446 and number of points 450 in point cloud 422 for object 404. For example, information process 444 compares location 446 to plurality of points 424 in point cloud 422. Information process 444 identifies number of points 450 in plurality of points 424 that are associated with location 446 to form association 448. Number of points 450 is associated with location 446 by being in a same relative location in point cloud 422 for object 404 as location 446 on object 404.

In this depicted example, number of points 450 is associated with number of parts 452 in parts 406. For example, each of number of points 450 is associated with an identification of a part in number of parts 452. Information process 444 associates location 446 with number of parts 452 based on association 448 between location 446 and number of points 450.

Information process 444 presents identification 454 of number of parts 452 for object 404 associated with location 446 on graphical user interface 456 on display system 458. Display system 458 is part of information collection system 410 in these examples.

In response to a presentation of identification 454 on graphical user interface 456, an operator may decide to use sensor system 416 to generate additional information in information 434. For example, an operator may use sensor system 416 to generate additional video data for object 404. As another example, the operator may decide to create an audio recording describing the appearance of number of parts 452 associated with location 446.

The additional information in information 434 generated by sensor system 416 is sent to information process 444. Information process 444 associates information 434 with location 446 on object 404. In some illustrative examples, information 434 may be presented on graphical user interface 456 on display system 458.

In these illustrative examples, location 446 on object 404, identification 454 of number of parts 452, and/or information 434 may be sent to computer system 412 for further processing. Computer system 412 may be comprised of number of computers 460.

Information management process 462 runs on number of computers 460. Information management process 462 is any process configured to use location 446 on object 404, identification 454 of number of parts 452, and/or information 434 to generate and/or manage information 402 about object 404. For example, information 434 generated by sensor system 416 may be used by information management process 462 to generate a report about object 404.

As one illustrative example, detection process 464 in information management process 462 may be configured to use location 446 on object 404, identification 454 of number of parts 452, and/or information 434 to identify number of inconsistencies 466 in object 404. An inconsistency, in these examples, may also be referred to as a nonconformance.

In these depicted examples, the identification of number of inconsistencies 466 may be used in performing operations 408. In one illustrative example, operations 408 include inspecting object 404 for inconsistencies. The identification of number of inconsistencies 466 is used to make determinations as additional operations are to be performed. For example, number of inconsistencies 466 may require rework or replacement of a part.

In some illustrative examples, operations 408 include assembling a number of parts together for object 404 and installing fasteners to assemble the number of parts together. Information 402 generated by information management process 462 may be used to identify the type and/or size of fasteners needed for assembling the parts together.

The illustration of object management environment 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, a first portion of number of computers 442 in computer system 418 may be in a location remote to a second portion of number of computers 442. Further, in some illustrative examples, information management process 462 with detection process 464 may be configured to run on number of computers 442. In this manner, computer system 412 may not be needed.

In other illustrative examples, object 404 may be a structure for a platform other than an aircraft. For example, object 404 may be a structure in a platform selected from one of a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a bridge, a manufacturing facility, a building, and/or some other suitable object.

Figure 5:
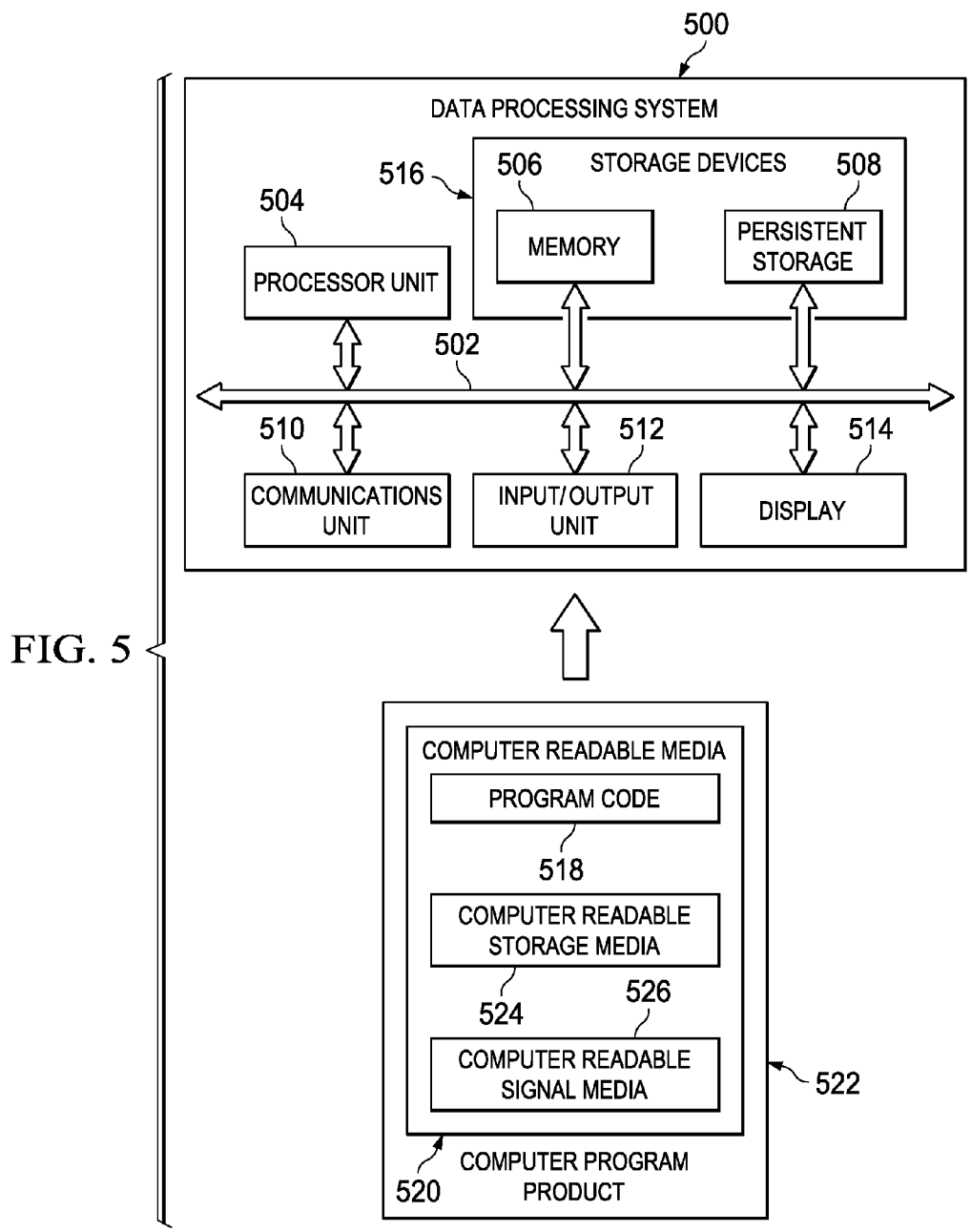
FIG. 5 is an illustration of a data processing system in accordance with an advantageous embodiment.

Turning now to FIG. 5, an illustration of a data processing system is depicted in accordance with an advantageous embodiment. In this illustrative example, data processing system 500 may be used to implement a computer in number of computers 442 in computer system 418 and/or a computer in number of computers 460 in computer system 412 in FIG. 4.

Data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504.

Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500. In these illustrative examples, computer readable storage media 524 is a non-transitory computer readable storage medium.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted because the processes for the different embodiments are implemented in a hardware unit.

In still another illustrative example, processor unit 504 may be implemented using a combination of processors found in computers and hardware units. Processor unit 404 may have a number of hardware units and a number of processors that are configured to run program code 518. With this depicted example, some of the processes may be implemented in the number of hardware units, while other processes may be implemented in the number of processors.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

Figure 6:
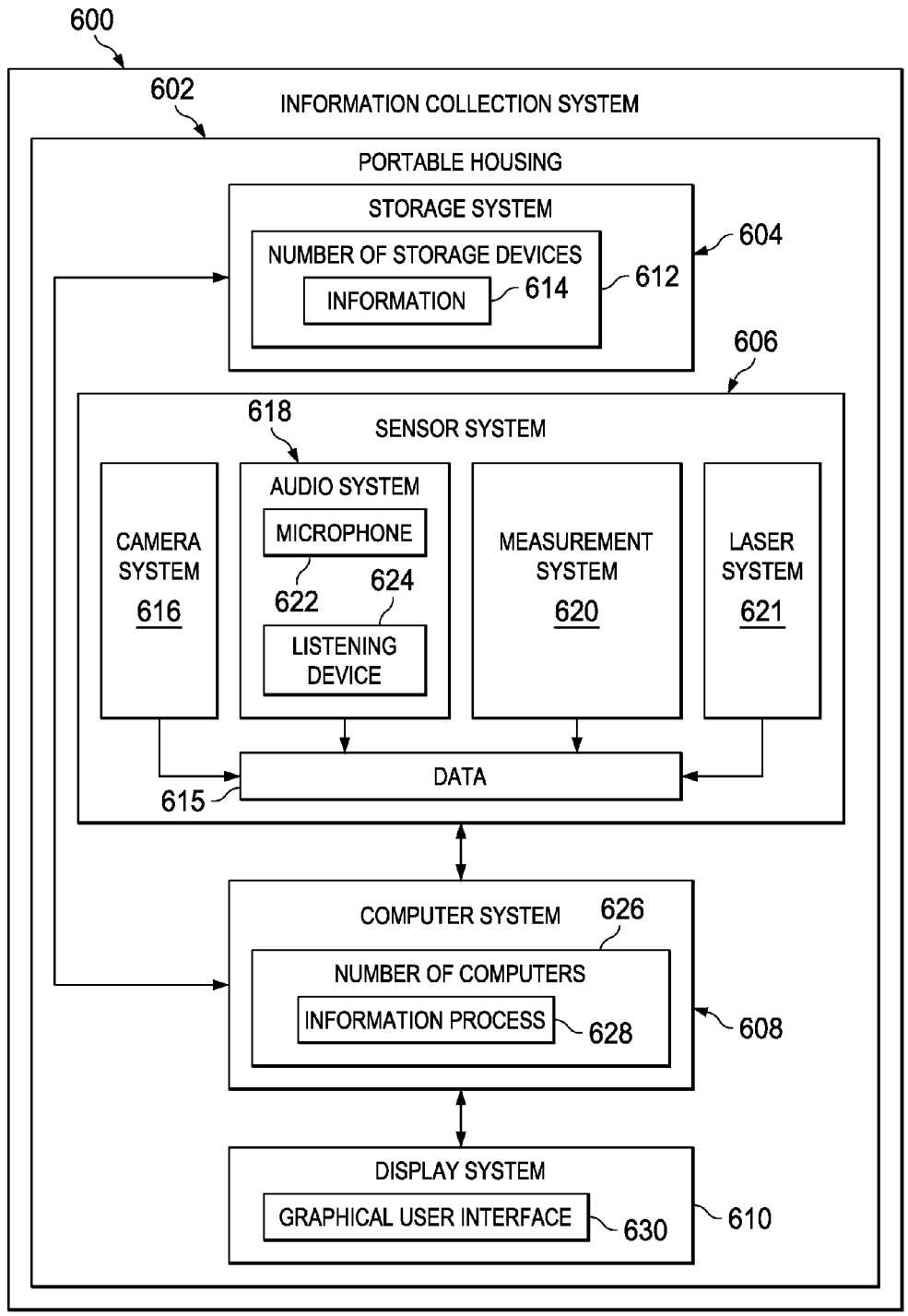
FIG. 6 is an illustration of an information collection system in accordance with an advantageous embodiment.

With reference now to FIG. 6, an illustration of an information collection system is depicted in accordance with an advantageous embodiment. In this illustrative example, information collection system 600 is an example of one implementation for information collection system 410 in FIG. 4.

As depicted, information collection system 600 includes portable housing 602, storage system 604, sensor system 606, computer system 608, and display system 610. Storage system 604, sensor system 606, computer system 608, and display system 610 are associated with portable housing 602. Further, computer system 608 is in communication with storage system 604, sensor system 606, and display system 610.

Portable housing 602, in this illustrative example, is a housing that is capable of being carried by, worn by, and/or moved around by an operator using information collection system 600. For example, portable housing 602 may be configured to be a handheld housing, a housing attached to a belt designed to be worn by an operator, or some other suitable type of housing.

Storage system 604 includes number of storage devices 612 associated with portable housing 602. Number of storage devices 612 is configured to store information 614. Information 614 may include at least one of, for example, without limitation, a model for an object, a point cloud for an object, a file, a report, a log, a policy, images, video data, audio data, sensor data, and/or other suitable types of information. In some illustrative examples, storage system 604 may be part of computer system 608.

In this illustrative example, sensor system 606 is configured to generate data 615 using camera system 616, audio system 618, measurement system 620, and/or laser system 621 in sensor system 606. Data 615 may include images, video data, audio data, measurements, amplitudes of detected response signals, and/or other suitable types of data.

Camera system 616 may include a visible camera and/or an infrared camera. Further, camera system 616 is configured to generate images and/or video data.

Audio system 618 includes microphone 622 and listening device 624 in this example. Microphone 622 is configured to detect sounds, such as, for example, the voice of an operator. Microphone 622 may be used to generate audio recordings. Listening device 624 may be used to play back audio recordings generated by audio system 618 and/or audio recordings stored on storage system 604. Of course, sensor system 606 may include other sensors and/or components in addition to the ones described above.

Measurement system 620 may comprise a number of measurement tools. For example, without limitation, measurement system 620 may include a tool for measuring diameters of holes in parts. As another example, measurement system 620 may include a tool for measuring a thickness of a part.

In this illustrative example, laser system 621 may take the form of a laser detection and ranging (LADAR) system or a light detection and ranging system (LIDAR). Laser system 621 is configured to generate a laser beam at a particular location on an object and detect a number of response signals in response to the laser beam.

In this depicted example, sensor system 606 is configured to send data 615 to computer system 608. As illustrated, computer system 608 comprises number of computers 626. Each of number of computers 626 may be a processor in this illustrative example. Information process 628 runs on number of computers 626. Information process 628 may be implemented as, for example, information process 444 in FIG. 4.

In these illustrative examples, information process 628 is configured to identify a location on an object using data 615. Images generated by camera system 616 may be used to identify a location on an object.

For example, an initial position and orientation for camera system 616 relative to the object are known. Further, the initial position and orientation for camera system 616 is at a known position and orientation relative to locations identified in a model for the object. Additionally, the relative locations of different parts for the object in the model for the object with respect to each other are known.

The initial position and orientation of camera system 616 is determined relative to a plane. The plane is selected, in these illustrative examples, arbitrarily. In other words, the plane is selected without needing to meet any particular criteria. The plane is also referred to as an origin in these examples.

The position and orientation of the origin are defined relative to the coordinate system for the object. The position and orientation of the origin are also defined relative to the model for the object. The position and orientation of camera system 616 relative to the object is determined using the position and orientation of camera system 616 relative to the origin and the position and orientation of the origin relative to the object. Further, this information may be used to identify the location on the object for which camera system 616 generates images.

In these examples, the model of the object and the object have substantially the same coordinate system such that a point on the surface of the object has the same location as the same point on the surface of the model of the object.

In this illustrative example, information process 628 is configured to send information to a computer system, such as computer system 412 in FIG. 4. This information may be used to perform a number of operations on the object.

Additionally, information process 628 is configured to present information on display system 610. In particular, information process 628 presents information on graphical user interface 630 for display system 610.

Figure 7:
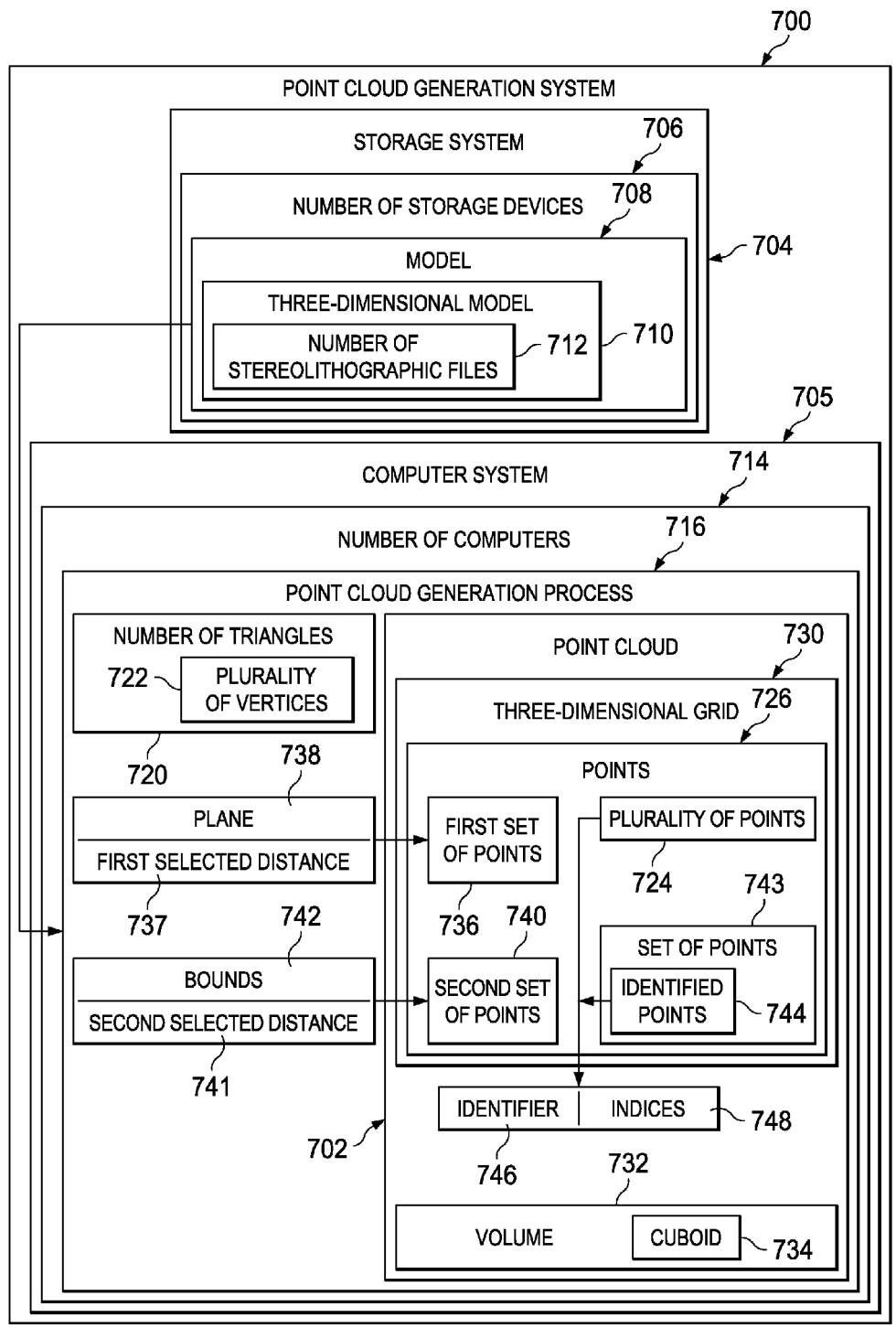
FIG. 7 is an illustration of a point cloud generation system in accordance with an advantageous embodiment.

With reference now to FIG. 7, an illustration of a point cloud generation system is depicted in accordance with an advantageous embodiment. In this illustrative example, point cloud generation system 700 is configured to generate data for point cloud 702. Point cloud 702 is an example of one implementation for point cloud 422 in FIG. 4.

In this illustrative example, point cloud generation system 700 includes storage system 704 and computer system 705. Storage system 704 comprises number of storage devices 706. Some, all, or none of number of storage devices 706 may be part of a storage system for an information collection system, such as storage system 414 for information collection system 410 in FIG. 4.

Number of storage devices 706 is configured to store model 708. Model 708 is a model for an object, such as object 404 in FIG. 4. Model 708 is three-dimensional model 710 in these examples. More specifically, three-dimensional model 710 comprises number of stereolithographic files 712. Each of number of stereolithographic files 712 may be for a part in the object for which model 708 was generated.

In this depicted example, computer system 705 comprises number of computers 714. Some, all, or none of number of computers 714 may be part of a computer system in an information management system, such as information management system 405 in FIG. 4. For example, some, all, or none of number of computers 714 may be part of computer system 412 or computer system 418 in FIG. 4.

Point cloud generation process 716 runs on number of computers 714 in these examples. Point cloud generation process 716 is configured to retrieve number of stereolithographic files 712 from storage system 704. Point cloud generation process 716 identifies number of triangles 720 for a part identified in each stereolithographic file in number of stereolithographic files 712. In particular, point cloud generation process 716 identifies plurality of vertices 722 for each triangle in number of triangles 720. Plurality of vertices 722 includes three vertices for each triangle.

As illustrated, point cloud generation process 716 assigns plurality of vertices 722 to plurality of points 724 from points 726 in point cloud 702. Points 726 are on three-dimensional grid 730. Further, points 726 are uniformly spaced on three-dimensional grid 730. As one illustrative example, point cloud generation process 716 assigns plurality of vertices 722 to plurality of points 724 by assigning each vertex in plurality of vertices 722 to a nearest point in point cloud 702.

Point cloud generation process 716 identifies volume 732 within point cloud 702. Volume 732 is cuboid 734 in these examples. Cuboid 734 encompasses plurality of vertices 722. In other words, each of plurality of vertices 722 is located within cuboid 734 in three-dimensional grid 730 for point cloud 702.

First set of points 736 in point cloud 702 is identified by point cloud generation process 716. First set of points 736 includes the points in points 726 in point cloud 702 that are within cuboid 734 and within first selected distance 737 from plane 738 defined by plurality of vertices 722. First selected distance 737 may be, for example, without limitation, one grid unit spacing in three-dimensional grid 730 from plane 738.

Second set of points 740 in point cloud 702 is identified by point cloud generation process 716. Second set of points 740 includes the points in points 726 in point cloud 702 that are within second selected distance 741 from bounds 742 defined by plurality of vertices 722. Bounds 742 may be the edges of the triangle formed by plurality of vertices 722. Second selected distance 741 may be outside of bounds 742 or within bounds 742.

Point cloud generation process 716 identifies set of points 743 at the intersection of first set of points 736 and second set of points 740. Set of points 743 form identified points 744 in point cloud 702. Point cloud generation process 716 assigns identifier 746 to identified points 744 and plurality of points 724 in point cloud 702.

Identifier 746 may be, for example, a part number for the part for which the particular stereolithographic file was generated. Point cloud generation process 716 stores indices 748 in identified points 744 and plurality of points 724 in point cloud 702. Indices 748 are all referenced to identifier 746. In this manner, identifier 746 is assigned to identified points 744 and plurality of points 724 in point cloud 702.

In this manner, point cloud generation process 716 generates data for point cloud 702 for an object. The data includes the identifiers for the different parts in the object and/or other suitable information.

In this illustrative example, point cloud 702 and the data generated for point cloud 702 may be stored in storage system 704. Further, point cloud 702 and the data generated for point cloud 702 may be sent to an information collection system, such as information collection system 410 in FIG. 4 and/or information collection system 600 in FIG. 6.

Figure 8:
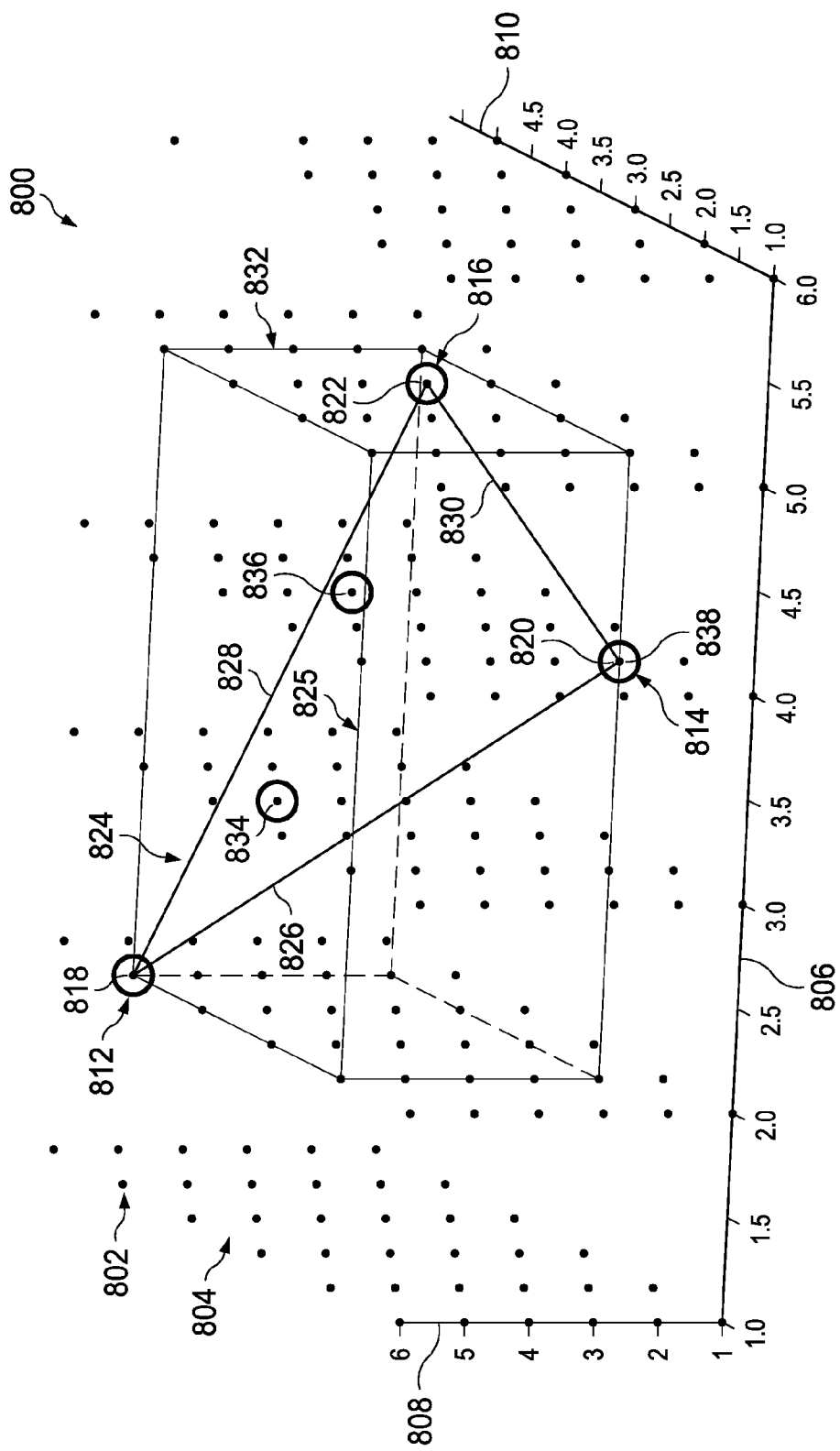
FIG. 8 is an illustration of a point cloud in accordance with an advantageous embodiment.

With reference now to FIG. 8, an illustration of a point cloud is depicted in accordance with an advantageous embodiment. In this illustrative example, point cloud 800 is an example of point cloud 422 in FIG. 4 and/or point cloud 702 in FIG. 7. Point cloud 800 has points 802.

As illustrated, points 802 are on three-dimensional grid 804. Three-dimensional grid 804 has first axis 806, second axis 808, and third axis 810. Points 802 are uniformly spaced on three-dimensional grid 804. In other words, each grid unit in three-dimensional grid 804 has substantially the same size.

In this illustrative example, vertices 812, 814, and 816 have been assigned to points 818, 820, and 822, respectively. Vertices 812, 814, and 816 form triangle 824 with bounds 826, 828, and 830. Further, plane 825 is defined by vertices 812, 814, and 816.

As depicted, vertices 812, 814, and 816 are encompassed within cuboid 832. Cuboid 832 is an example of one implementation for volume 732 in FIG. 7. Using cuboid 832, plane 825, and bounds 826, 828, and 830, a point cloud generation system may identify a set of points in points 802 within cuboid 832, within a first selected distance from plane 825, and within a second selected distance from bounds 826, 828, and 830.

In this illustrative example, the set of points includes points 834, 836, and 838. Each of these points and points 818, 820, and 822 is associated with an identifier for a part. For example, an index may be stored for each point in which the index is referenced to a part number for a part. The part is the part for which the stereolithographic file identifying triangle 824 was created.

Figure 9:
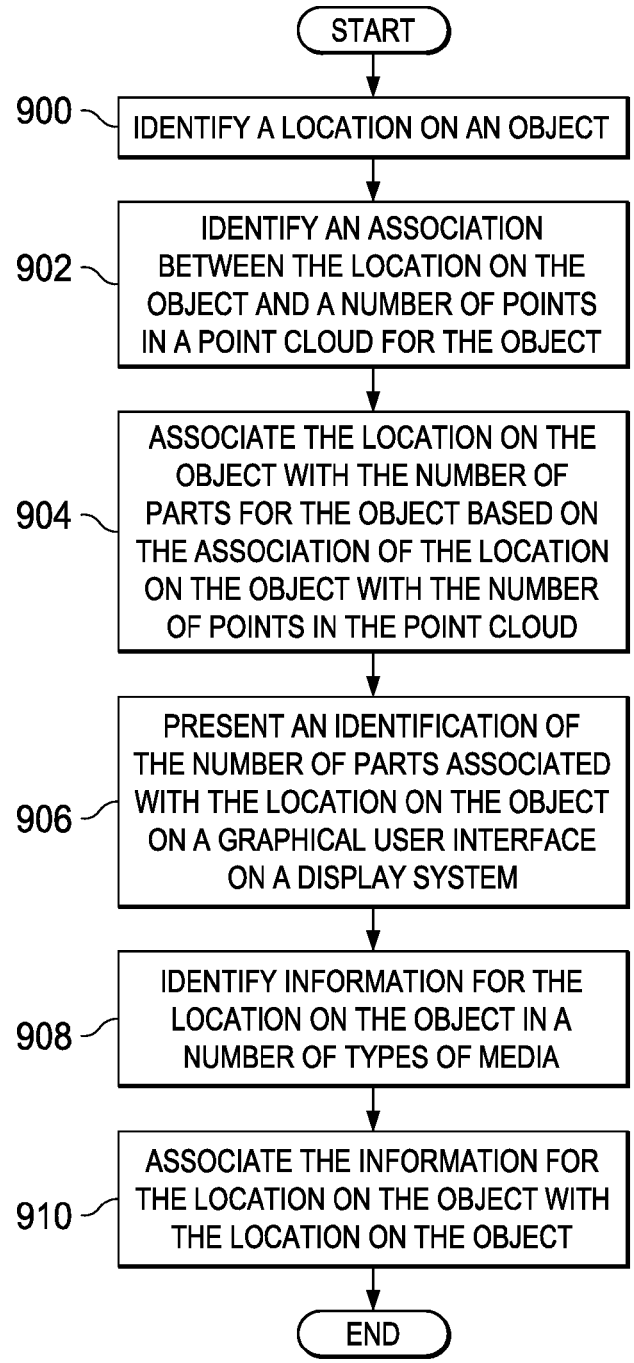
FIG. 9 is an illustration of a flowchart of a process for managing information about an object in accordance with an advantageous embodiment.

With reference now to FIG. 9, an illustration of a flowchart of a process for managing information about an object is depicted in accordance with an advantageous embodiment. The process illustrated in FIG. 9 may be implemented using, for example, information management system 405 in FIG. 4. In particular, this process may be implemented using information process 444 in FIG. 4.

The process begins by identifying a location on an object (operation 900). This location may be identified using data obtained from a sensor system, such as sensor system 416 in FIG. 4. Further, this location may be identified using a coordinate system, such as a Cartesian coordinate system.

The process identifies an association between the location on the object and a number of points in a point cloud for the object (operation 902). The number of points in the point cloud is associated with a number of parts for the object. In this illustrative example, more than one point may be associated with a same part.

Next, the process associates the location on the object with the number of parts for the object based on the association of the location on the object with the number of points in the point cloud (operation 904). Thereafter, the process presents an identification of the number of parts associated with the location on the object on a graphical user interface on a display system (operation 906). In this manner, the operators may be able to view the number of parts identified as associated with the location.

The process then identifies information for the location on the object in a number of types of media (operation 908). Operation 908 may be performed by receiving information generated by a sensor system in the number of types of media. For example, the information may include at least one of images, video data, and audio data.

The process associates the information for the location on the object with the location on the object (operation 910), with the process terminating thereafter.

Figure 10:
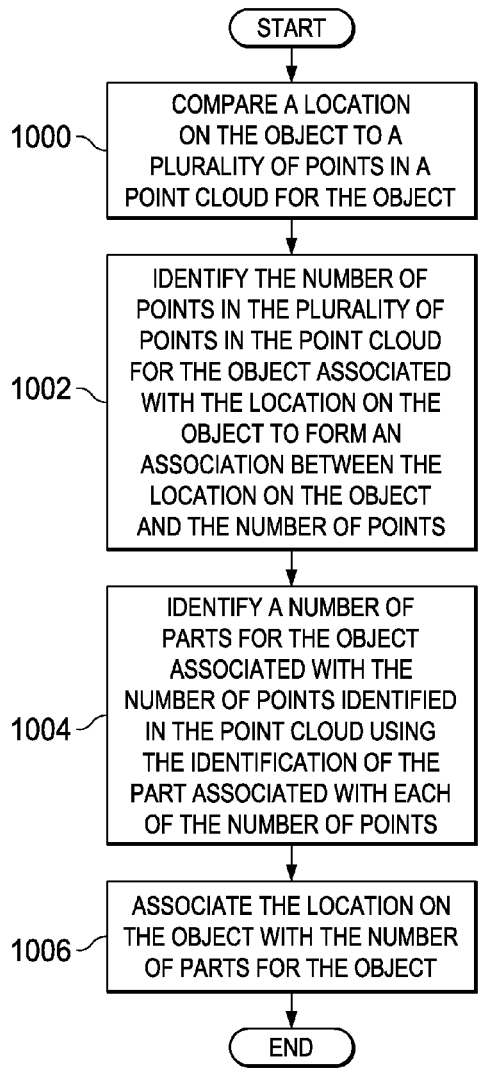
FIG. 10 is an illustration of a flowchart of a process for associating a location with a number of parts in accordance with an advantageous embodiment.

With reference now to FIG. 10, an illustration of a flowchart of a process for associating a location with a number of parts is depicted in accordance with an advantageous embodiment. The process illustrated in FIG. 10 is a more detailed process of operation 902 and operation 904 in FIG. 9. This process may be implemented using information management system 405 in FIG. 4. In particular, the process illustrated in FIG. 10 may be implemented using information process 444 in FIG. 4.

The process begins by comparing a location on the object to a plurality of points in a point cloud for the object (operation 1000). In operation 1000, the location is the location identified in operation 900 in FIG. 9. Each of the plurality of points in the point cloud is associated with an identification of a part for the object.

Thereafter, the process identifies the number of points in the plurality of points in the point cloud for the object associated with the location on the object to form an association between the location on the object and the number of points (operation 1002). Next, the process identifies a number of parts for the object associated with the number of points identified in the point cloud using the identification of the part associated with each of the number of points (operation 1004).

The process then associates the location on the object with the number of parts for the object (operation 1006), with the process terminating thereafter.

Figure 11:
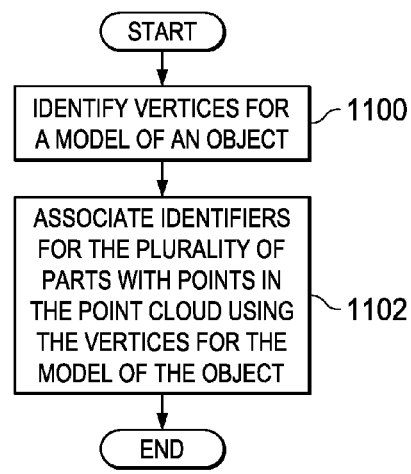
FIG. 11 is an illustration of a flowchart of a process for generating data for a point cloud in accordance with an advantageous embodiment.

With reference now to FIG. 11, an illustration of a flowchart of a process for generating data for a point cloud is depicted in accordance with an advantageous embodiment. The process illustrated in FIG. 11 may be implemented using point cloud generation system 700 in FIG. 7. In particular, this process may be implemented using point cloud generation process 716 in FIG. 7.

The process begins by identifying vertices for a model of an object (operation 1100). The object is comprised of a plurality of parts. For example, the object is formed when the plurality of parts is assembled together. In operation 1100, the model for the object is a three-dimensional model.

Thereafter, the process associates identifiers for the plurality of parts with points in the point cloud using the vertices for the model of the object (operation 1102), with the process terminating thereafter.

Figure 12:
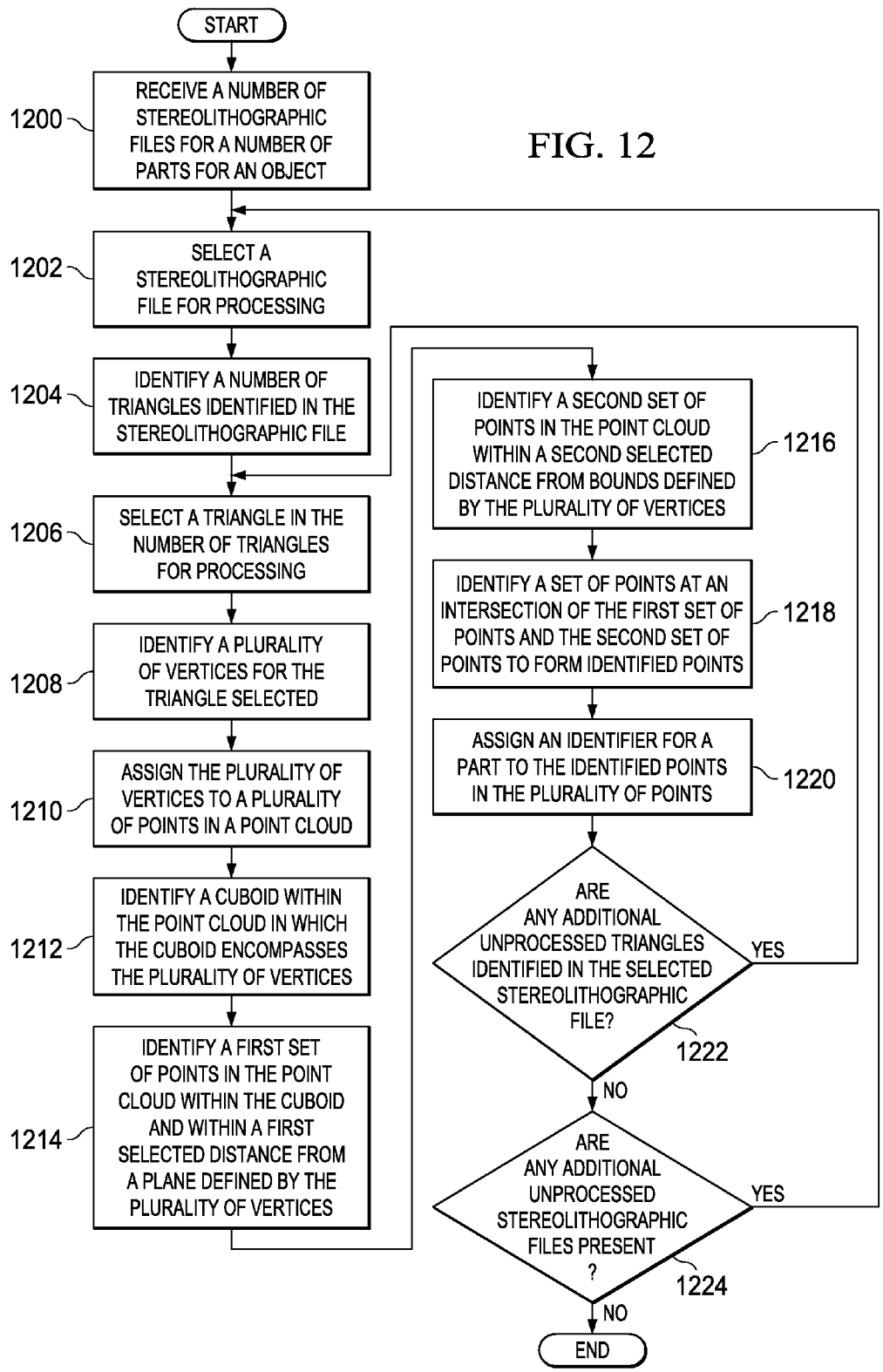
FIG. 12 is an illustration of a flowchart of a process for generating data for a point cloud in accordance with an advantageous embodiment.

With reference now to FIG. 12, an illustration of a flowchart of a process for generating data for a point cloud is depicted in accordance with an advantageous embodiment. The process illustrated in FIG. 12 may be implemented using point cloud generation system 700 in FIG. 7. In particular, this process may be implemented using point cloud generation process 716 in FIG. 7.

The process begins by receiving a number of stereolithographic files for a number of parts for an object (operation 1200). The process selects a stereolithographic file for processing (operation 1202). Next, the process identifies a number of triangles identified in the stereolithographic file (operation 1204).

Thereafter, the process selects a triangle in the number of triangles for processing (operation 1206). The process identifies a plurality of vertices for the triangle selected (operation 1208).

The process then assigns the plurality of vertices to a plurality of points in a point cloud (operation 1210). The point cloud is comprised of points on a three-dimensional grid. The three-dimensional grid is a uniformly spaced grid in these examples. In operation 1210, each vertex is assigned to a point in the point cloud by assigning the vertex to the nearest point in the point cloud.

Next, the process identifies a cuboid within the point cloud in which the cuboid encompasses the plurality of vertices (operation 1212). The process identifies a first set of points in the point cloud within the cuboid and within a first selected distance from a plane defined by the plurality of vertices (operation 1214). The first selected distance may be, for example, one grid unit spacing.

Thereafter, the process identifies a second set of points in the point cloud within a second selected distance from bounds defined by the plurality of vertices (operation 1216). The second selected distance from the bounds may be within the bounds or outside of the bounds. The bounds are defined as the edges formed by the plurality of vertices in these examples.

The process then identifies a set of points at an intersection of the first set of points and the second set of points to form identified points (operation 1218). Thereafter, the process assigns an identifier for a part to the identified points and the plurality of points (operation 1220). The part is the part for which the selected stereolithographic file was created.

Next, the process determines whether any additional unprocessed triangles are identified in the selected stereolithographic file (operation 1222). If unprocessed triangles are present, the process returns to operation 1206 as described above. Otherwise, the process determines whether any additional unprocessed stereolithographic files are present (operation 1224). If additional unprocessed stereolithographic files are present, the process returns to operation 1202 as described above. Otherwise, the process terminates.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for managing information about an object. In one advantageous embodiment, a location on an object is identified. An association between the location on the object and a number of points in a point cloud for the object is identified. The number of points in the point cloud is associated with a number of parts for the object. The location on the object is associated with the number of parts for the object based on the association of the location on the object with the number of points in the point cloud. An identification of the number of parts associated with the location on the object is presented on a graphical user interface on a display system. Information for the location on the object in a number of types of media is identified. The information for the location on the object is identified with the location on the object.

In another advantageous embodiment, a method for generating data for a point cloud is provided. Vertices for a model of an object are identified. The object comprises a plurality of parts. Identifiers for the plurality of parts are associated with points in the point cloud using the vertices for the object.

With the different advantageous embodiments, designs for objects, such as vehicles, may be more easily evaluated when assembling the objects from the designs. Additionally, the different advantageous embodiments increase the speed at which parts can be identified in assemblies of parts for an object. The different advantageous embodiments also make it easier to identify when and where maintenance, as well as other operations, may be needed for objects.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing information about an object, the method comprising:
   identifying, using an information process in a computer system, a location on the object;
   identifying, using the information process in the computer system, an association between the location on the object and a number of points in a point cloud for the object, wherein the number of points in the point cloud is associated with a number of parts for the object;
   associating, using the information process in the computer system, the location on the object with the number of parts for the object based on the association of the location on the object with the number of points in the point cloud;
   presenting, using the information process in the computer system, an identification of the number of parts associated with the location on the object on a graphical user interface on a display system;
   identifying, using the information process in the computer system, information for the location on the object in a number of types of media; and
   associating, using the information process in the computer system, the information for the location on the object with the location on the object.

2. The method of claim 1, wherein the step of identifying the information for the location on the object in the number of types of media comprises:
   generating the information for the location on the object using a sensor system, wherein the information comprises at least one of images, video data, and audio data for the location on the object.

3. The method of claim 2, wherein the sensor system includes a number of sensors selected from a group comprising a camera, and a microphone.

4. The method of claim 1, wherein the step of identifying the information for the location on the object in the number of types of media comprises:
   retrieving the information for the location on the object from a number of storage devices storing the information in the number of types of media.

5. The method of claim 1 further comprising:
   sending, using the information process in the computer system, a request for the point cloud for the object; and
   retrieving, using the information process in the computer system, the point cloud for the object.

6. The method of claim 1, wherein the step of identifying the association between the location on the object and the number of points in the point cloud for the object, wherein the number of points in the point cloud is associated with the number of parts for the object comprises:
   comparing the location on the object to a plurality of points in the point cloud for the object, wherein each of the plurality of points is associated with an identification of a part for the object; and
   identifying the number of points in the plurality of points in the point cloud for the object associated with the location on the object to form the association; and wherein the step of associating the location on the object with the number of parts for the object based on the association of the location on the object with the number of points in the point cloud comprises:
   identifying the number of parts for the object associated with the number of points identified in the point cloud using the identification of the part associated with each of the number of points in the plurality of points; and
   associating the location on the object with the number of parts for the object.

7. The method of claim 1 further comprising:
   sending, using a communications link, at least one of the location on the object, the identification of the number of parts associated with the location on the object, and the information for the location on the object to at least one computer system in an information management system.

8. The method of claim 1 further comprising:
   sending, using the information process in the computer system, at least one of the location on the object, the identification of the number of parts associated with the location on the object, and the information for the location on the object, to a detection process configured to detect inconsistencies in the object, wherein the computer system is a first computer system in an information management system, and the detection process is in a second computer system in the information management system.

9. The method of claim 1 further comprising:
   presenting the information for the location on the object in the number of types of media on the graphical user interface on the display system.

10. The method of claim 1 further comprising:
    performing, using at least one computer system in an information management system, a number of operations on the number of parts for the object using the identification of the number of parts associated with the location on the object and the information for the location on the object.

11. The method of claim 1 further comprising:
    converting, using a point cloud generation process in a point cloud generation system computer system, a three-dimensional model for the object into the point cloud for the object.

12. The method of claim 11, wherein the three-dimensional model for the object is a number of stereolithography files for the object.

13. The method of claim 1, wherein the step of identifying the location on the object comprises:
    identifying the location on the object using a number of images generated by a camera system.

14. The method of claim 1, wherein more than one point in the point cloud is associated with the part.

15. An apparatus comprising:
    a sensor system configured to generate information for a location on an object in a number of types of media;
    a computer system in communication with the sensor system and configured to identify the location on the object using the information generated by the sensor system; identify an association between the location on the object and a number of points in a point cloud for the object, wherein the number of points in the point cloud is associated with a number of parts for the object; associate the location on the object with the number of parts for the object based on the association of the location on the object with the number of points in the point cloud; present an identification of the number of parts associated with the location on the object on a graphical user interface on a display system; and
    associate the information for the location on the object generated by the sensor system in the number of types of media with the location on the object.

16. The apparatus of claim 15 further comprising:
a storage system in communication with the computer system and configured to store the point cloud and the information generated by the sensor system.

17. The apparatus of claim 16, wherein the computer system is further configured to retrieve data from the storage system and wherein the data comprises at least one of the point cloud for the object, a file, a report, a log, and a policy.

18. The apparatus of claim 15, wherein the information generated by the sensor system comprises at least one of images, video data, and audio data.

19. The apparatus of claim 15, wherein the sensor system includes a number of sensors selected from a group comprising a camera and a microphone.

20. The apparatus of claim 15, wherein in being configured to identify the association between the location on the object and the number of points in the point cloud for the object, wherein the number of points in the point cloud is associated with the number of parts for the object,
the computer system is configured to compare the location on the object to a plurality of points in the point cloud for the object, wherein each of the plurality of points is associated with an identification of a part for the object; and identify the number of points in the plurality of points in the point cloud for the object associated with the location on the object to form the association; and
wherein in being configured to associate the location on the object with the number of parts for the object based on the association between the location on the object with the number of points in the point cloud,
the computer system is configured to identify the number of parts for the object associated with the number of points identified in the point cloud using the identification of the part associated with each of the number of points in the plurality of points; and associate the location on the object with the number of parts for the object.

21. The apparatus of claim 15, wherein the computer system is a first computer system and wherein the first computer system is configured to send at least one of the location on the object, the identification of the number of parts associated with the location on the object, and the information for the location on the object to a second computer system in communication with the first computer system.

22. The apparatus of claim 15, wherein at least one of the location on the object, the identification of the number of parts associated with the location on the object, and the information for the location on the object is sent to a detection process configured to detect inconsistencies in the object.

23. The apparatus of claim 15 further comprising:
the display system in which the display system is associated with the computer system.

24. The apparatus of claim 15, wherein the computer system is configured to present the information for the location on the object in the number of types of media on the graphical user interface on the display system.

25. The apparatus of claim 15, wherein the computer system is configured to convert a three-dimensional model for the object into the point cloud for the object.

26. The apparatus of claim 25, wherein the three-dimensional model for the object comprises a number of stereolithography files for the object.

27. The apparatus of claim 15, wherein in being configured to identify the location on the object, the computer system is configured to identify the location on the object using a number of images generated by the sensor system.

28. A portable inspection system comprising:
a housing;
a storage system associated with the housing and configured to store data for parts for an object;
a sensor system associated with the housing, and configured to generate information for a location on the object in a number of types of media, wherein the information generated by the sensor system comprises at least one of images, video data, and audio data;
a computer system associated with the housing and in communication with the storage system and the sensor system, wherein the computer system is configured to identify the location on the object; identify an association between the location on the object and a number of points in a point cloud for the object, wherein the number of points in the point cloud is associated with a number of parts for the object; associate the location on the object with the number of parts for the object based on the association between the location on the object with the number of points in the point cloud; present an identification of the number of parts associated with the location on the object on a graphical user interface on a display system; obtain the information for the location on the object from the sensor system; associate the information for the location on the object with the location on the object; and identify a number of inconsistencies in the object using the location on the object, the identification of the number of parts associated with the location on the object, and the information for the location on the object;
the display system associated with the housing and in communication with the computer system, wherein the display system is configured to display the identification of the number of parts associated with the location on the object on the graphical user interface.

29. The portable inspection system of claim 28, wherein the sensor system includes a number of sensors selected from a group comprising a camera and a microphone.

30. The portable inspection system of claim 28, wherein the computer system is further configured to retrieve the information for the location on the object from the storage system and wherein the information comprises at least one of the point cloud for the object, a file, a report, a log, and a policy.

31. The portable inspection system of claim 28, wherein in being configured to identify the association between the location on the object and the number of points in the point cloud for the object, wherein the number of points in the point cloud is associated with the number of parts for the object,
the computer system is configured to compare the location on the object to a plurality of points in the point cloud for the object, wherein each of the plurality of points is associated with an identification of a part for the object; and identify the number of points in the plurality of points in the point cloud for the object associated with the location on the object to form the association; and
wherein in being configured to associate the location on the object with the number of parts for the object based on the association between the location on the object with the number of points in the point cloud,
the computer system is configured to identify the number of parts for the object associated with the number of points identified in the point cloud using the identification of the part associated with each of the number of points in the plurality of points; and associate the location on the object with the number of parts for the object.

32. The portable inspection system of claim 28, wherein a portion of a number of computers in the computer system is in a location remote to the housing.

* * * * *